United States Patent [19]

Hammer, Jr.

[11] 4,136,599

[45] Jan. 30, 1979

[54] PLASTIC SCREW GROMMET

[75] Inventor: Victor S. Hammer, Jr., Hoffman Estates, Ill.

[73] Assignee: Illinois Tool Works Inc., Chicago, Ill.

[21] Appl. No.: 856,474

[22] Filed: Dec. 1, 1977

[51] Int. Cl.$^2$ ............................................. F16B 13/04
[52] U.S. Cl. ............................................. 85/80; 85/83
[58] Field of Search ................... 85/80, 81, 82, 83, 84, 85/85; 151/41, 73

[56] References Cited

U.S. PATENT DOCUMENTS

| 895,769 | 8/1908 | Kohnstamm | 85/84 |
| 1,120,369 | 12/1914 | Booraemetal | 85/83 |
| 1,248,008 | 11/1917 | Pleister | 85/83 |
| 2,424,757 | 7/1947 | Klump | 85/80 X |
| 3,516,324 | 6/1970 | Berner | 85/83 |
| 3,593,612 | 7/1971 | Schulze | 85/83 X |
| 3,937,122 | 2/1976 | Riedel | 85/83 X |

FOREIGN PATENT DOCUMENTS

| 1813812 | 7/1969 | Fed. Rep. of Germany | 85/83 |
| 1909099 | 3/1970 | Fed. Rep. of Germany | 85/83 |
| 409890 | 5/1910 | France | 85/83 |
| 1332253 | 6/1963 | France | 85/84 |
| 1141913 | 2/1969 | United Kingdom | 85/83 |
| 1221702 | 2/1971 | United Kingdom | 85/83 |

*Primary Examiner*—Thomas J. Holko

*Attorney, Agent, or Firm*—Jack R. Halvorsen; Robert W. Beart

[57] ABSTRACT

A one-piece plastic screw grommet for use in mounting a screw relative to a blind bore located in a fibrous material. The grommet includes a shank portion and may have a laterally extending head at one end. The shank has a first diameter portion adjacent the head complementary in size to the bore and connected to a smaller free end portion by a tapered intermediate portion. Annular rings and axially disposed anti-rotation means, each having a radial extent greater than said bore, are carried on the exterior of said shank. A transverse slot extends through the intermediate and first diameter portions and a pair of flexible shouldered arms are disposed within the slots in opposed walls and extend axially toward said head end from their connection to said free end. A non-circular bore extends through the head end and first portion and blends into a cylindrical bore in said free end portion with the interior opposed arm surfaces of said arms having a concave cross section, the concavity having a radius of curvature substantially equal to the free end bore which equals the pitch diameter of the screw to be accepted therein. Each arm includes an interior and exterior taper and carries a flange at its free end for engaging the bore of the fibrous material to prevent inversion of said arms when subjected to pull-out forces.

5 Claims, 9 Drawing Figures

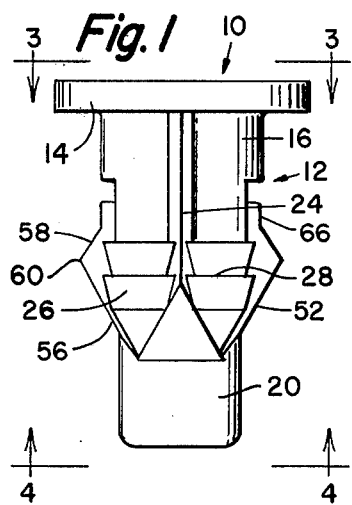
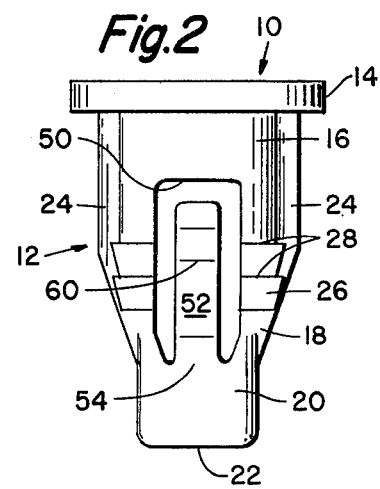
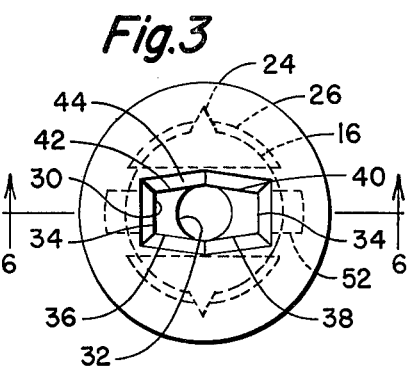
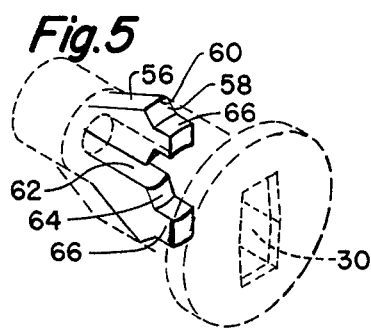
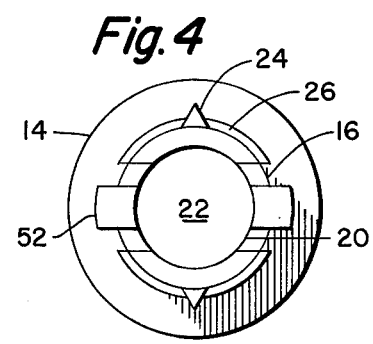
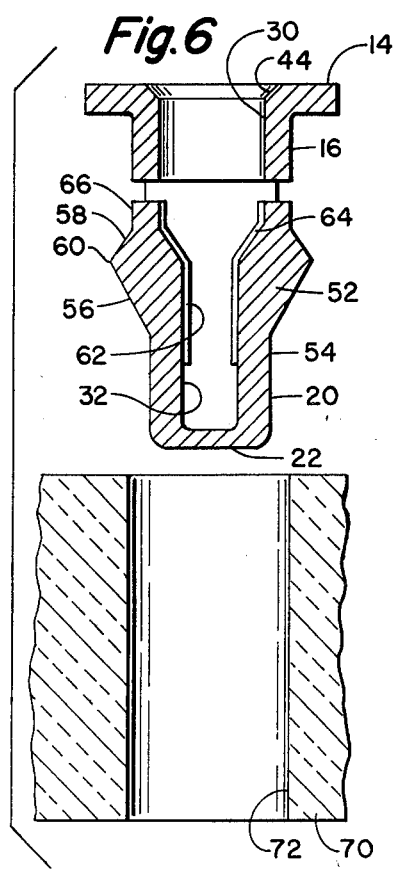
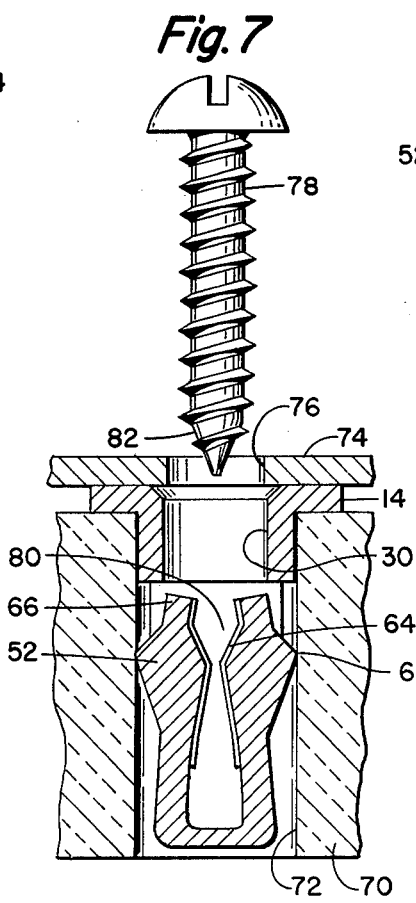
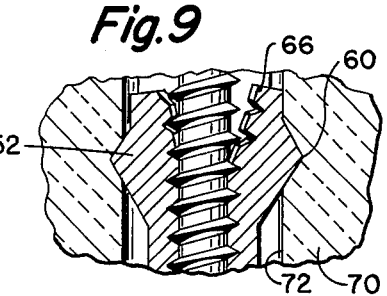
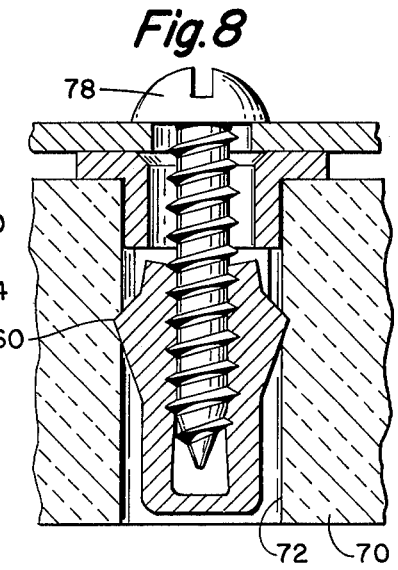

PLASTIC SCREW GROMMET

BACKGROUND OF THE INVENTION

This invention relates to a one-piece plastic screw grommet for placement in a blind bore hole of a fibrous material, i.e. chip board or flake board made of compressed wood chips and a binding agent, for accepting a screw to retain a secondary member relative to the fibrous material.

Expandable plugs having longitudinal slots and toothed exteriors for frictionally fastening fasteners relative to a blind bore hole are well known in the art. For example, the U.S. Pat. No. 3,516,324 to Berner discloses such a device for use in brickwork. Similar devices are shown in United States Patents to Wallace U.S. Pat. No. 2,316,918; Keeler U.S. Pat. No. 1,940,307; Booraem et al U.S. Pat. No. 1,120,369; Pleister et al U.S. Pat. No. 1,469,666; and Fisher U.S. Pat. No. 3,280,875, to mention but a few of the anchoring sockets or plugs that are found in United States Classes 151-41.73; 85-83; and 85-72.

While many of these sockets for accepting screws and other fasteners have found some acceptance in the trade, none of them have been found satisfactory for use with the fibrous materials that are currently being utilized in the furniture trade for structural members. The chip or flake boards do not have the thickness necessary to accept the elongated frictional sockets or plugs which have been contemplated heretofore in the prior art. Basically, they require a concentrated localized force to be applied to compress the material in a specific location to thereby prevent rotation of the plug during insertion of the screw as well as to provide pull-out strength. Most of the previous fasteners have been used in shear and not in tension, and hence the requirements for pull-out strength from the blind bore or aperture have been minimal. In many of the present applications, the requirements for pull-out or tensile strength are relatively higher since the basic material or chip board is used structurally with an overlay of a veneer for decorative purposes.

SUMMARY OF THE INVENTION

The present invention relates to a one-piece plastic screw grommet for acceptance within a bore in a fibrous material and which will provide adequate pull-out strengths with a minimal axial extent of the fastener per se. Such a fastener includes a shank having a first portion at its head end substantially complementary to the diameter of the bore within which it is inserted. An intermediate section tapers down to a free end portion which is initially inserted into the bore having a lesser diameter than the first portion, and in the preferred embodiment, has a closed or sealed end.

A pair of opposed slots extend through the first and intermediate portions and provide room for a pair of flexible arms having external shoulder means and a tapered internal portion for engagement of the workpiece upon introduction of a fastening means such as a screw with the external shoulders biting into and compressing the fibrous material. Annular shoulder means and axially extending rib means having a diameter greater than the bore are provided for initial engagement with the workpiece by the fastener and anti-rotational gripping by the fastener during insertion of the screw.

Each of the arms is also tapered on the inside adjacent their free ends and provided with a concave configuration, having a radius of curvature substantially equal to the pitch diameter of the screw, within which the screw is accepted. The concave configuration of the arms at their point of attachment is substantially equal to the diameter of the axial bore within the fastener at its free end to insure full thread engagement. Axially extending flange means are provided at the free end of the arm for engagement with the wall of the bore to prevent inversion of the arms against extreme pull-out stress. A head may be provided but is not mandatory. A device of the present type insures a short length screw grommet, as compared to plugs and sockets of the prior art, which provides repeatable success in various chip board consistencies for retaining a secondary member by screw means relative to the screw grommet, as contemplated by the present invention.

According to the present invention an inexpensive one-piece item is provided which can be rapidly assembled with a minimum of instruction to the operating personnel utilizing same.

A further feature of the present invention is a trapezoidal shaped aperture passing through the head for acceptance and alignment of the screw, said trapezoidal shaped bore blending into the cylindrical bore of the free end section.

Further advantages will be apparent to those skilled in the art when the detailed description is read with the accompanying drawings.

BRIEF DESCRIPTION OF THE DRAWINGS

FIG. 1 is an elevational view of a preferred embodiment of the present invention;

FIG. 2 is an elevational view of the embodiment of FIG. 1 rotated 90°;

FIG. 3 is a top end view taken along Line 3—3 of FIG. 1;

FIG. 4 is a bottom end view taken along Line 4—4 of FIG. 1;

FIG. 5 is a perspective view, partially in phantom, showing the configuration of the arms utilized in the present invention;

FIG. 6 is an exploded elevational view in section showing a fastener taken along Line 6—6 of FIG. 3 in combination with a suitable bore in a fibrous material prior to insertion;

FIG. 7 is an elevational view in partial section with a fastener of the present invention in initially inserted condition and with the screw prior to insertion through the secondary member to be supported by the fibrous material;

FIG. 8 is an elevational view in partial section showing the screw inserted and the grommet expanded into embedded or retained position; and FIG. 9 is a fragmentary view in partial section of a grommet according to the present invention as it is subjected to abnormal tensile stress.

DETAILED DESCRIPTION OF THE INVENTION

Referring now to the drawings wherein similar parts are described by similar numerals, a screw grommet 10 of the type contemplated by the present invention includes a shank 12 and optionally may include a head 14. While the preferred embodiment shown here does include the head 14, it is to be recognized that the fastener is capable of being utilized for flush applications without a head.

The shank 12 includes a first cylindrical portion 16 at the head end that has a diameter substantially complementary to the diameter of the bore in the fibrous material with which it is to be associated. An intermediate portion 18 tapers inwardly to a free end portion 20 having a diameter smaller than the head end first portion 16 and including a closed end 22. One or more axially extending V-shaped ribs 24 extend from the head end axially to the intermediate portion and intersect at their lower extremities with one or more annularly disposed ribs or shoulder means 26, the latter having a generally frusto-conical undersurface that tapers inwardly towards the free end and provides an abrupt shoulder 28 on its upper side. The radial extent of the axially extending ribs 24 is substantially greater than the diameter of the bore with which it is to be associated as are the oversized shoulder means 26, both of which will bite into the fibrous material with which the device is to be associated for purposes of preventing rotation and axial movement during insertion of a fastener therein.

A continuous bore 30 extends from the head end through the fastener to the closed free end 22. The lower bore portion 32, within the free end portion 20, is substantially cylindrical and has a diameter approximating the pitch diameter of the screw fastener with which it is to be associated. In the intermediate portion, the bore tapers outwardly and blends into a polygonal shaped bore, as best seen in FIG. 3, which in the present instance is an elongated shape with substantially flat ends 34 and major sides 36, 38, 40 and 42 that diverge linearly from their connection to the flat ends 34 toward their midpoints which fall on a plane lying in the axis of the fastener to form a generally six-sided figure. It will be noted that each third side, as one counts around the edges of the bore, are substantially parallel, with at least two of said parallel sides being spaced a distance substantially equal to the pitch diameter of the screw to be used therewith. For example, sides 36 and 40 are parallel and when extended along an imaginary line would be spaced apart a distance substantially equal to the diameter of the lower bore portion 32 also being the pitch diameter of the screw to be associated therewith. It will also be noted that in FIG. 3 the open end of the bore is chamferred as at 44, in FIG. 6, to assist in introduction of a fastener into the bore.

The intermediate and first portions of the shank accommodate a generally U-shaped slot 50 which traverses opposed walls of the shank and provides free movement to a pair of arms 52 having their lower extremity affixed to the lower portion 20, as indicated by the numeral 54. Each of the arms is provided with an increasing radial extent or cam surface 56 and an upper decreasing or cam surface 58 to form a shoulder 60 at the intersection of the two surfaces. The interior of the arm adjacent its connection with the lower portion 20 forms an extension of the lower bore 32 and hence has a concave surface 62 that is a segmental continuation of lower bore 32. The inside surface of the arms 52 are tapered outwardly as at 64 at a point substantially coplanar with the shoulder means 60 and terminate with an axially extending flange means 66, for purposes best set forth hereinafter. The opposed interior surfaces of the outwardly diverging portion 64 and the flange means 66 are also concave in cross section and generally have a radius of curvature substantially equal to the pitch diameter of the screw with which they are to be associated.

In utilizing such a fastener or screw grommet, a panel 70 of fibrous material such as chip board or wood is provided with a bore 72 having a diameter substantially equal to the diameter of the first cylindrical portion 16. The fastener is axially telescoped until the head 14 abuts the upper surface of the panel 70 with the legs 52 being resiliently bent inwardly towards each other. The secondary element 74 includes a through aperture 76 and is aligned with the bore 30 so that a screw threaded member 78 can be inserted therein. It will be noted that the diverging portions 64 on the interior surface of each leg, along with the spaced upper flanges 66, generally form an open throat 80 for the acceptance of the tapered point 82 on the screw 78.

The axial telescoping and movement of the screw impresses a thread form in the interior surfaces of the legs 52, as defined by the flanges 66, the diverging surfaces 64 and the concave portion 62, all of which readily accept the screws since they are provided with a radius of curvature substantially equal to the pitch diameter. As can be seen in FIG. 8, the shoulder 60 will embed into the fibrous panel 70 to whatever extent is required, and further, be dependent upon the relationship of the hardness of the material from which the screw grommet 10 is fabricated when compared to the specific density of the material 70 at the region where the shoulder 60 engages same.

When an undue tensile stress is applied to the head of screw 78 which causes a further embedment of the shoulder 60 into the fibrous material of panel 70, as seen in FIG. 9, the axially extending flange 66 at the free ends of the arms 52 engages the side wall of the bore 72 and prevents inversion or complete bending of the arms 52, assuming a localized softness of the fibrous material 70, when the shoulder 60 digs into the panel 70.

As was previously mentioned, the present invention is totally operable without a head 14, although not shown, since the useage of such devices and their efficacy is known to those acquainted with the fastener art. Either configuration, with or without a head, is preferably injection molded of suitable plastic materials such as nylon. Other materials will be apparent to those skilled in the art and dependent upon the hardness of material desired for use with the particular application of fibrous material.

I claim:

1. A one-piece plastic screw grommet for use in mounting a screw relative to a blind bore of a predetermined diameter located in a fibrous material panel, said grommet including a head and a shank having a common bore passing through said head into said shank, said shank having an upper first portion with an external dimension adjacent said head substantially equal to said predetermined bore diameter and said shank carrying axially disposed rotation prevention means thereon, circumferentially disposed shoulder means intermediate the extremities of said shank and projecting radially beyond said predetermined dimension, an intermediate tapered portion connecting said predetermined dimensioned upper portion and a lesser dimension lower portion extending to the free end of said shank opposite said head, said shoulder means being at least two in number and disposed on said upper portion with said tapered intermediate portion blending into the lowest axially located shoulder means, said shank further including at least two axially extending slots which communicate between the common bore and the external surface of said shank, a shouldered arm positioned in each of said slots and connected at one extremity adjacent the said lesser dimension lower portion and extending toward said head, each said shouldered arm on its radially outer surface being tapered outwardly to an intermediate point and thence inwardly to form shoulder means, the inner surface of said arms adjacent their point of connection to said shank lower portion initially having substantially parallel opposed surfaces extending axially to an intermediate point and then diverging outwardly away from one another to form a throat, adapted to lead in a screw, said intermediate point on the inner surface of said arms lying in a plane transverse to the axis and adjacent to or on a plane passing through the shoulder means carried by said arms, and axially extending flange means integral with and extending from the double tapered free ends of said arms, said common bore is non-circular through said head and a substantial portion of said shank and thence blending into a cylindrical bore in said lower portion said non-circular bore being generally in cross section an elongated shape with the major sides diverging linearly from their connection to substantially flat ends toward their midpoints which fall on a plane lying in the axis of the fastener to form a generally six-sided figure, each third side being substantially parallel and with at least two pairs of said parallel sides being spaced a distance substantially equal to the pitch diameter of a screw to be used therewith whereby said screw will be guided into axial alignment with said cylindrical bore in said lower portion thereby substantially preventing canted introduction of said screw.

2. A grommet of the type claimed in claim 1 wherein said rotation preventing means includes at least one axially extending sharp rib having a radial extent greater than said circumferentially disposed shoulder means.

3. A grommet of the type claimed in claim 1 wherein the circular bore in said lower portion of the shank is substantially equal to the pitch diameter of a screw to be used therewith, the initially substantially parallel opposed surfaces of said arms being concave in cross section and having a radius of curvature equal to and being axial continuations of said circular bore.

4. A grommet of the type claimed in claim 3 wherein said outwardly divergent inner surfaces of said arms and said axially extending flange means have a concave cross section facing said bore with a radius of curvature equal to said lower end bore of the shank to assist in the introduction of a tapered end screw to be inserted into said grommet when said arms are deflected into said bore as the grommet is inserted into a bore in fibrous material.

5. A grommet of the type claimed in claim 4 wherein said flange means initially having their outer surfaces falling on an imaginary extension of the outer surfaces of the shank adjacent said head, said flange means being capable of contacting the walls of the bore in said fibrous material panel to prevent total destructive inversion of said arms in pull-out situations.

* * * * *